United States Patent
Princen et al.

(10) Patent No.: US 9,985,781 B2
(45) Date of Patent: May 29, 2018

(54) ENSURING AUTHENTICITY IN A CLOSED CONTENT DISTRIBUTION SYSTEM

(71) Applicant: Acer Cloud Technology, Inc., Sunnyvale, CA (US)

(72) Inventors: John Princen, Cupertino, CA (US); Pramila Srinivasan, Pleasanton, CA (US); David Blythe, Kirkland, WA (US); Wei Yen, Clyde Hill, WA (US)

(73) Assignee: Acer Cloud Technology, Inc., Sunnyvale, CA (US)

( * ) Notice: Subject to any disclaimer, the term of this patent is extended or adjusted under 35 U.S.C. 154(b) by 0 days. days.

(21) Appl. No.: 15/475,806

(22) Filed: Mar. 31, 2017

(65) Prior Publication Data
US 2017/0230176 A1    Aug. 10, 2017

Related U.S. Application Data

(63) Continuation of application No. 15/131,883, filed on Apr. 18, 2016, now Pat. No. 9,646,142, which is a continuation of application No. 12/507,050, filed on Jul. 21, 2009, now abandoned, which is a continuation-in-part of application No. 10/463,224, filed on Jun. 16, 2003, now abandoned, which is a continuation-in-part of application No. 10/360,827, filed on Feb. 7, 2003, now Pat. No. 7,322,042.

(51) Int. Cl.
| | |
|---|---|
| G06F 21/00 | (2013.01) |
| H04L 9/08 | (2006.01) |
| H04L 9/16 | (2006.01) |
| H04L 9/32 | (2006.01) |
| G06F 21/60 | (2013.01) |
| G06F 21/10 | (2013.01) |

(52) U.S. Cl.
CPC .......... *H04L 9/0891* (2013.01); *G06F 21/105* (2013.01); *G06F 21/602* (2013.01); *H04L 9/0861* (2013.01); *H04L 9/0894* (2013.01); *H04L 9/16* (2013.01); *H04L 9/3247* (2013.01); *G06F 2212/402* (2013.01); *G06F 2221/0704* (2013.01); *G06F 2221/0755* (2013.01); *H04L 2209/60* (2013.01)

(58) Field of Classification Search
None
See application file for complete search history.

(56) References Cited

U.S. PATENT DOCUMENTS

| | | |
|---|---|---|
| 5,095,798 A | 3/1992 | Okada et al. |
| 5,184,830 A | 2/1993 | Okada et al. |

(Continued)

FOREIGN PATENT DOCUMENTS

| | | |
|---|---|---|
| DE | 20014381 | 11/2000 |
| EP | 0961193 | 12/1999 |

(Continued)

OTHER PUBLICATIONS

Arbaugh, William A. et al., "A Secure and Reliable Bootstrap Architecture," University of Pennsylvania (1996).

(Continued)

*Primary Examiner* — Jeffery Williams
(74) *Attorney, Agent, or Firm* — Sheppard, Mullin, Richter & Hampton LLP

(57) ABSTRACT

A technique for maintaining encrypted content received over a network in a secure processor without exposing a key used to decrypt the content in the clear is disclosed.

20 Claims, 5 Drawing Sheets

(56) References Cited

U.S. PATENT DOCUMENTS

| | | |
|---|---|---|
| 5,238,250 A | 8/1993 | Leung et al. |
| 5,261,069 A | 11/1993 | Wilkinson et al. |
| 5,367,698 A | 11/1994 | Webber et al. |
| 5,400,402 A | 3/1995 | Garfinkle |
| 5,404,505 A | 4/1995 | Levinson |
| 5,426,763 A | 6/1995 | Okada et al. |
| 5,528,513 A | 6/1996 | Vaitzblit et al. |
| 5,577,209 A | 11/1996 | Boyle et al. |
| 5,586,264 A | 12/1996 | Belknap et al. |
| 5,590,199 A | 12/1996 | Krajewski, Jr. et al. |
| 5,610,839 A | 3/1997 | Karolak et al. |
| 5,638,443 A | 6/1997 | Stefik et al. |
| 5,715,398 A | 2/1998 | Lubenow et al. |
| 5,715,403 A | 2/1998 | Stefik |
| 5,765,152 A | 6/1998 | Erickson |
| 5,781,901 A | 7/1998 | Kuzma |
| 5,786,587 A | 7/1998 | Colgate, Jr. |
| 5,790,170 A | 8/1998 | Suzuki et al. |
| 5,799,086 A | 8/1998 | Sudia |
| 5,805,712 A | 9/1998 | Davis |
| 5,809,242 A | 9/1998 | Shaw et al. |
| 5,815,662 A | 9/1998 | Ong |
| 5,818,512 A | 10/1998 | Fuller |
| 5,829,046 A | 10/1998 | Tzelnic et al. |
| 5,867,223 A | 2/1999 | Schindler et al. |
| 5,892,900 A | 4/1999 | Ginter et al. |
| 5,903,723 A | 5/1999 | Beck et al. |
| 5,905,860 A | 5/1999 | Olsen et al. |
| 5,909,491 A | 6/1999 | Luo |
| 5,913,039 A | 6/1999 | Nakamura et al. |
| 5,917,912 A | 6/1999 | Ginter et al. |
| 5,933,498 A | 8/1999 | Schneck et al. |
| 5,983,227 A | 11/1999 | Nazem et al. |
| 6,014,558 A | 1/2000 | Thomas |
| 6,016,348 A | 1/2000 | Blatter et al. |
| 6,029,046 A | 2/2000 | Khan et al. |
| 6,032,200 A | 2/2000 | Lin |
| 6,038,601 A | 3/2000 | Lambert et al. |
| 6,044,157 A | 3/2000 | Uesaka et al. |
| 6,049,821 A | 4/2000 | Theriault et al. |
| 6,052,720 A | 4/2000 | Traversal et al. |
| 6,085,193 A | 7/2000 | Malkin et al. |
| 6,141,756 A | 10/2000 | Bright et al. |
| 6,148,340 A | 11/2000 | Bittinger et al. |
| 6,157,721 A | 12/2000 | Shear et al. |
| 6,167,441 A | 12/2000 | Himmel |
| 6,185,625 B1 | 2/2001 | Tso et al. |
| 6,195,433 B1 | 2/2001 | Vanstone et al. |
| 6,205,475 B1 | 3/2001 | Pitts |
| 6,212,657 B1 | 4/2001 | Wang et al. |
| 6,219,680 B1 | 4/2001 | Bernardo et al. |
| 6,219,708 B1 | 4/2001 | Martenson |
| 6,226,618 B1 | 5/2001 | Downs et al. |
| 6,243,719 B1 | 6/2001 | Ikuta et al. |
| 6,256,637 B1 | 7/2001 | Venkatesh et al. |
| 6,259,471 B1 | 7/2001 | Peters et al. |
| 6,278,782 B1 | 8/2001 | Ober et al. |
| 6,289,452 B1 | 9/2001 | Arnold et al. |
| 6,292,899 B1 | 9/2001 | McBride |
| 6,310,956 B1 | 10/2001 | Morito et al. |
| 6,321,209 B1 | 11/2001 | Pasquali |
| 6,330,566 B1 | 12/2001 | Durham |
| 6,338,050 B1 | 1/2002 | Conklin et al. |
| 6,371,854 B1 | 4/2002 | Ikeda et al. |
| 6,377,972 B1 | 4/2002 | Guo et al. |
| 6,389,460 B1 | 5/2002 | Stewart et al. |
| 6,389,538 B1 | 5/2002 | Gruse et al. |
| 6,397,186 B1 | 5/2002 | Bush et al. |
| 6,412,008 B1 | 6/2002 | Fields et al. |
| 6,412,011 B1 | 6/2002 | Agraharam et al. |
| 6,427,238 B1 | 7/2002 | Goodman et al. |
| 6,442,691 B1 | 8/2002 | Blandford |
| 6,446,113 B1 | 9/2002 | Ozzie et al. |
| 6,466,048 B1 | 10/2002 | Goodman |
| 6,480,883 B1 | 11/2002 | Tsutsumitake |
| 6,500,070 B1 | 12/2002 | Tomizawa et al. |
| 6,510,502 B1 | 1/2003 | Shimizu |
| 6,526,581 B1 | 2/2003 | Edson |
| 6,544,126 B2 | 4/2003 | Sawano et al. |
| 6,557,104 B2 | 4/2003 | Vu et al. |
| 6,571,279 B1 | 5/2003 | Herz et al. |
| 6,574,605 B1 | 6/2003 | Sanders et al. |
| 6,594,682 B2 | 7/2003 | Peterson et al. |
| 6,606,644 B1 | 8/2003 | Ford et al. |
| 6,637,029 B1 | 10/2003 | Maissel et al. |
| 6,654,388 B1 | 11/2003 | Lexenberg et al. |
| 6,669,096 B1 | 12/2003 | Saphar et al. |
| 6,675,350 B1 | 1/2004 | Abrams et al. |
| 6,691,312 B1 | 2/2004 | Sen et al. |
| 6,697,948 B1 | 2/2004 | Rabin et al. |
| 6,704,797 B1 | 3/2004 | Fields et al. |
| 6,711,553 B1 | 3/2004 | Deng et al. |
| 6,751,729 B1 | 6/2004 | Giniger et al. |
| 6,760,324 B1 | 7/2004 | Scott et al. |
| 6,785,712 B1 | 8/2004 | Hogan et al. |
| 6,805,629 B1 | 10/2004 | Weiss |
| 6,811,486 B1 | 11/2004 | Luciano, Jr. |
| 6,826,593 B1 | 11/2004 | Acharya et al. |
| 6,832,241 B2 | 12/2004 | Tracton et al. |
| 6,859,535 B1 | 2/2005 | Tatebayashi et al. |
| 6,873,975 B1 | 3/2005 | Hatakeyama et al. |
| 6,882,979 B1 | 4/2005 | Reay et al. |
| 6,901,386 B1 | 5/2005 | Dedrick et al. |
| 6,920,567 B1 | 7/2005 | Doherty et al. |
| 6,928,551 B1 | 8/2005 | Lee et al. |
| 6,938,021 B2 | 8/2005 | Shear et al. |
| 6,948,070 B1 | 9/2005 | Ginter et al. |
| 6,993,557 B1 | 1/2006 | Yen |
| 7,020,480 B2 | 3/2006 | Coskun et al. |
| 7,024,394 B1 | 4/2006 | Ashour et al. |
| 7,039,708 B1 | 5/2006 | Knobl et al. |
| 7,051,212 B2 | 5/2006 | Ginter et al. |
| 7,062,500 B1 | 6/2006 | Hall et al. |
| 7,069,451 B1 | 6/2006 | Ginter et al. |
| 7,092,953 B1 | 8/2006 | Haynes |
| 7,099,479 B1 | 8/2006 | Ishibashi et al. |
| 7,120,802 B2 | 10/2006 | Shear et al. |
| 7,124,304 B2 | 10/2006 | Bel et al. |
| 7,130,829 B2 | 10/2006 | Bannerjee et al. |
| 7,134,144 B2 | 11/2006 | McKune |
| 7,143,290 B1 | 11/2006 | Ginter et al. |
| 7,206,765 B2 | 4/2007 | Gilliam et al. |
| 7,228,437 B2 | 6/2007 | Spagna et al. |
| 7,237,123 B2 | 6/2007 | Levine et al. |
| 7,322,042 B2 | 1/2008 | Srinivasan et al. |
| 7,330,717 B2 | 2/2008 | Gidron et al. |
| 7,380,275 B2 | 5/2008 | Srinivasan et al. |
| 7,415,620 B2 | 8/2008 | England et al. |
| 7,636,843 B1 | 12/2009 | Asano et al. |
| 7,644,429 B2 | 1/2010 | Bayassi et al. |
| 7,779,482 B1 | 8/2010 | Yen et al. |
| 2001/0014882 A1 | 8/2001 | Stefik et al. |
| 2001/0026287 A1 | 10/2001 | Watanabe |
| 2001/0036292 A1 | 11/2001 | Levy et al. |
| 2002/0016818 A1 | 2/2002 | Kirani et al. |
| 2002/0032784 A1 | 3/2002 | Darago et al. |
| 2002/0049909 A1 | 4/2002 | Jackson et al. |
| 2002/0052798 A1 | 5/2002 | Nishikado et al. |
| 2002/0057799 A1 | 5/2002 | Kohno |
| 2002/0059384 A1 | 5/2002 | Kaars |
| 2002/0071557 A1 | 6/2002 | Nguyen |
| 2002/0085720 A1 | 7/2002 | Okada et al. |
| 2002/0095382 A1 | 7/2002 | Taoka et al. |
| 2002/0108028 A1 | 8/2002 | Nunoe |
| 2002/0116615 A1 | 8/2002 | Nguyen et al. |
| 2002/0137566 A1 | 9/2002 | Tomizawa et al. |
| 2002/0138764 A1 | 9/2002 | Jacobs et al. |
| 2002/0154799 A1 | 10/2002 | Anderson et al. |
| 2002/0160833 A1 | 10/2002 | Lloyd et al. |
| 2002/0161673 A1 | 10/2002 | Lee et al. |
| 2002/0161996 A1 | 10/2002 | Koved et al. |
| 2002/0162115 A1 | 10/2002 | Bruckner et al. |
| 2002/0165022 A1 | 11/2002 | Hiraoka |
| 2002/0165028 A1 | 11/2002 | Miyamoto et al. |

(56) References Cited

U.S. PATENT DOCUMENTS

| | | |
|---|---|---|
| 2002/0169974 A1 | 11/2002 | McKune |
| 2002/0183045 A1 | 12/2002 | Emmerson et al. |
| 2002/0184046 A1 | 12/2002 | Kamada et al. |
| 2002/0184160 A1 | 12/2002 | Tadayon et al. |
| 2003/0004888 A1 | 1/2003 | Kambayashi et al. |
| 2003/0009423 A1 | 1/2003 | Wang et al. |
| 2003/0023427 A1 | 1/2003 | Cassin et al. |
| 2003/0023564 A1 | 1/2003 | Padhye et al. |
| 2003/0028622 A1 | 2/2003 | Inoue et al. |
| 2003/0045355 A1 | 3/2003 | Comair |
| 2003/0114227 A1 | 6/2003 | Rubin |
| 2003/0120541 A1 | 6/2003 | Siann et al. |
| 2003/0140241 A1 | 7/2003 | England et al. |
| 2003/0144869 A1 | 7/2003 | Fung et al. |
| 2003/0157985 A1 | 8/2003 | Shteyn |
| 2003/0166398 A1 | 9/2003 | Netanel |
| 2003/0182142 A1 | 9/2003 | Valenzuela et al. |
| 2003/0198351 A1 | 10/2003 | Foster et al. |
| 2003/0220142 A1 | 11/2003 | Siegel |
| 2004/0015426 A1 | 1/2004 | Tadayon et al. |
| 2004/0039929 A1 | 2/2004 | Decime |
| 2004/0044901 A1 | 3/2004 | Serkowski et al. |
| 2004/0054923 A1 | 3/2004 | Seago et al. |
| 2004/0083388 A1 | 4/2004 | Nguyen |
| 2004/0098297 A1 | 5/2004 | Borthwick |
| 2004/0098580 A1 | 5/2004 | DeTreville |
| 2004/0098610 A1 | 5/2004 | Hrastar |
| 2004/0102987 A1 | 5/2004 | Takahashi et al. |
| 2004/0116119 A1 | 6/2004 | Lewis et al. |
| 2004/0158742 A1 | 8/2004 | Srinivasan et al. |
| 2005/0004875 A1 | 1/2005 | Kontio et al. |
| 2005/0038753 A1 | 2/2005 | Yen et al. |
| 2005/0071640 A1 | 3/2005 | Sprunk et al. |
| 2005/0097618 A1 | 5/2005 | Arling et al. |
| 2005/0122977 A1 | 6/2005 | Lieberman |
| 2005/0132217 A1 | 6/2005 | Srinivasan et al. |
| 2005/0232284 A1 | 10/2005 | Karaoguz et al. |
| 2005/0273438 A1 | 12/2005 | Yen et al. |
| 2005/0273439 A1 | 12/2005 | Yen et al. |
| 2006/0026691 A1 | 2/2006 | Kim et al. |
| 2006/0031222 A1 | 2/2006 | Hannsmann |
| 2006/0080529 A1 | 4/2006 | Yoon et al. |
| 2006/0090084 A1 | 4/2006 | Buer |
| 2006/0129848 A1 | 6/2006 | Paksoy et al. |
| 2006/0136570 A1 | 6/2006 | Pandya |
| 2006/0153368 A1 | 7/2006 | Beeson |
| 2006/0236122 A1 | 10/2006 | Field et al. |
| 2007/0005504 A1 | 1/2007 | Chen et al. |
| 2007/0016832 A1 | 1/2007 | Weiss |
| 2007/0067826 A1 | 3/2007 | Conti |
| 2007/0150730 A1 | 6/2007 | Conti |
| 2007/0255659 A1 | 11/2007 | Yen et al. |
| 2008/0091945 A1 | 4/2008 | Princen et al. |
| 2008/0096608 A1 | 4/2008 | Wendling |
| 2008/0275750 A1 | 11/2008 | Robinson et al. |
| 2009/0150293 A1 | 6/2009 | Yen et al. |
| 2010/0017501 A1 | 1/2010 | Yen et al. |
| 2010/0031035 A1 | 2/2010 | Princen et al. |

FOREIGN PATENT DOCUMENTS

| | | |
|---|---|---|
| EP | 0992922 | 4/2000 |
| EP | 1061516 | 12/2000 |
| EP | 1091274 | 4/2001 |
| EP | 1883031 | 1/2008 |
| GB | 2341523 | 3/2000 |
| JP | H10207779 | 8/1998 |
| JP | H11203127 | 7/1999 |
| JP | H11331150 | 11/1999 |
| JP | 2000508940 | 7/2000 |
| JP | 2001195077 | 7/2001 |
| JP | 2001340646 | 12/2001 |
| JP | 2002024178 | 1/2002 |
| JP | 2002373080 | 12/2002 |
| JP | 2003006171 | 1/2003 |
| JP | 2003030157 | 1/2003 |
| WO | 1997039811 | 10/1997 |
| WO | 2000050978 | 8/2000 |
| WO | 2000059151 | 10/2000 |
| WO | 2001046800 | 6/2001 |
| WO | 2001097010 | 12/2001 |
| WO | 2002029642 | 4/2002 |
| WO | 2002030088 | 4/2002 |
| WO | 2003005145 | 1/2003 |

OTHER PUBLICATIONS

Aziz, Ashar et al., "Privacy and Authentication for Wireless Local Area Networks," Sun Microsystems, Inc. (1993).

Bharadvaj, Harini et al., "An Active Transcoding Proxy to Support Mobile Web Access," 17th IEEE Symposium on Reliable Distributed Systems, pp. 118-123 (1998).

Davida, George I. et al., "Defending Systems Against Viruses Through Cryptographic Authentication," Proceedings of the 1989 IEEE Symposium on Security and Privacy, pp. 312-318 (1989).

Diffie, Whitfield et al., "New Directions in Cryptography," IEEE Transactions on Information Theory (1976).

Diffie, Whitfield, "The First Ten Years of Public-Key Cryptography," Proceedings of the IEEE, vol. 76, No. 5, pp. 560-577 (May 1988).

Dodson, David A., "Gain Some Perspective With Innovation's GBA to TV Converter," Jun. 6, 2002, http://www.viewonline.com/pages/articles/innovationGBATV.htm, accessed Mar. 29, 2008.

Dyer, Joan G. et al., "Building the IBM 4758 Secure Coprocessor," Computer, pp. 2-12 (Oct. 2001).

Frantzen, Mike et al., "StackGhost: Hardware Facilitated Stack Protection," Proceedings of the 10th USENIX Security Symposium (2001).

Fujimura, Ko, et al., "Digital-Ticket-Controlled Digital Ticket Circulation," Proceedings of the 8th USENIX Security Symposium (1999).

Gligor, Virgil P., "20 Years of Operating Systems Security," University of Maryland (1999).

Gutmann, Peter, "The Design of a Cryptographic Security Architecture," Proceedings of the 8th USENIX Security Symposium (1999).

Hori et al., "Annotation-Based Web Content Transcoding," Computer Networks, 33(1-6): 197-211 (2000).

Itoi, Naomaru, "SC-CFS: Smartcard Secured Cryptographic File System," Proceedings of the 10th USENIX Security Symposium (2001).

Jaeger, Trent et al., "Building Systems that Flexibly Control Downloaded Executable Context," Proceedings of the 6th USENIX UNIX Security Symposium (1996).

Karger, Paul A., "New Methods for Immediate Revocation," Proceedings of the 1989 IEEE Symposium on Security and Privacy (1989).

Kent, Stephen Thomas, "Protecting Externally Supplied Software in Small Computers," Massachusetts Institute of Technology (1980).

Kogan, Noam et al., "A Practical Revocation Scheme for Broadcast Encryption Using Smart Cards," Proceedings of the 2003 IEEE Symposium on Security and Privacy (2003).

Lampson, Butler et al., "Authentication in Distributed Systems Theory and Practice," Digital Equipment Corporation (1992).

Lotspiech, Jeffrey et al., "Anonymous Trust: Digital Rights Management Using Broadcast Encryption," Proceedings of the IEEE, vol. 92, No. 6, pp. 898-909 (Jun. 2004).

Lotspiech, Jeffrey et al., "Broadcast Encryption's Bright Future," Computer, pp. 57-63 (Aug. 2002).

Monrose et al., "Toward Speech-Generated Cryptographic Keys on Resource Constrained Devices," Proceedings of the 11th USENIX Security Symposium (2002).

Neboyskey, "A Leap Forward: Why States Should Ratify the Uniform Computer Information Transaction Act," Federal Communications Law Journal, vol. 52, No. 3, pp. 793-820 (May 2000).

Neumann, P.G. et al., "A Provably Secure Operating System," Stanford Research Institute (1975).

(56) References Cited

OTHER PUBLICATIONS

Nonnenmacher, Jorg et al., "Asynchronous Multicast Push: AMP," Proceedings of the 13th International Conference on Computer Communication, pp. 419-430 (Nov. 1997).
Palmer, Elaine R., "An Introduction to Citadel—A Secure Crypto Coprocessor for Workstations," IBM Research Division (1992).
Peterson, David S. et al., "A Flexible Containment Mechanism for Executing Untrusted Code," Proceedings of the 11th USENIX Security Symposium (2002).
Rodriguez, Pablo et al. "Improving the WWW: Caching or Multicast?," Computer Networks and ISDN Systems, 30 (22-23):2223-2243 (Nov. 25, 1998).
Rubin, Aviel D., "Trusted Distribution of Software Over the Internet," Internet Society 1995 Symposium on Network and Distributed System Security (1995).
Smith, Sean et al., "Validating a High-Performance, Programmable Secure Coprocessor," Secure Systems and Smart Cards, IBM T.J. Watson Research Center, NY (1996).
Smith, Sean W. et al., "Building a High-Performance, Programmable Secure Coprocessor," Secure Systems and Smart Cards, IBM T.J. Watson Research Center, NY (1998).
Smith, Sean W. et al., "Using a High-Performance, Programmable Secure Coprocessor," Proceedings of the Second International Conference on Financial Cryptography (1998).
Smith, Sean W., "Secure Coprocessing Applications and Research Issues," Los Alamos Unclassified Release LA-UR-96-2805 (1996).
Stefik, Mark, "Trusted Systems," Scientific American, pp. 78-81 (Mar. 1997).
Traylor, Scott, "Graphic Resolution and File Sizes," http://www.traylormm.com/harvard/53graphicresolution/ (1997).
Tygar, J.D. et al., "Dyad: A System for Using Physically Secure Coprocessors," School of Computer Science, Carnegie Mellon University (1991).
Tygar, J.D. et al., "Strongbox: A System for Self-Securing Programs," Carnegie Mellon Computer Science: A 25-Year Commemorative, ed. R. Rashid, ACM Press and Addison-Wesley, pp. 163-197 (1991).
Van Doorn, Leendert, "A Secure Java(TM) Virtual Machine," Proceedings of the 9th USENIX Security Symposium (2000).
Wang, Zheng et al. "Prefetching in World Wide Web," Global TeleCommunications Conference, pp. 28-32 (Nov. 1996).
White et al., "ABYSS: An Architecture for Software Protection," IEEE Transactions on Software Engineering, vol. 16, No. 6, pp. 619-629 (1990).
White, Steve R. et al., "Introduction to the Citadel Architecture: Security in Physically Exposed Environments," IBM Research Division (1991).
Wikimedia Foundation, Inc., "Game Boy Advance," <http://en.wikipedia.org/wiki/GameBoyAdvanced> accessed Mar. 30, 2008.
Wikimedia Foundation, Inc., "Game Boy," <http://en.wikipedia.org/wiki/Game_Boy_Advanced> accessed Mar. 30, 2008.
Wikimedia Foundation, Inc., "Nintendo Game Cube," <http://en.wikipedia.org/wiki/Game_Cube> accessed Mar. 28, 2008.
Wobber, Edward et al., "Authentication in the Taso Operating System," Digital Systems Research Center (1993).
Yee, B. et al., "Secure Coprocessors in Electronic Commerce Applications," Proceedings of the First USENIX Workshop on Electronic Commerce (1995).
Yee, B., "Using Secure Coprocessors," Ph.D. Thesis, School of Computer Science, Carnegie Mellon University, Pittsburgh, PA (1994).
U.S. Appl. No. 10/463,224, filed Jun. 16, 2003.
International Search Report of PCT Application No. PCT/US2007/010797, dated Aug. 5, 2008.
Search Report and Written Opinion dated May 8, 2007 from International Application No. PCT/US2004/040486.
Search Report and Written Opinion dated Oct. 8, 2008 from International Application No. PCT/US2007/20074.
Search Report and Written Opinion dated Jun. 14, 2005 from International Application No. PCT/US2004/037050.
Search Report and Written Opinion dated Nov. 18, 2010 from International Application No. PCT/US2010/041980.
Search Report and Written Opinion dated Jun. 22, 2007 from International Application No. PCT/US2004/003413.
Search Report and Written Opinion dated Apr. 24, 2008 from International Application No. PCT/US2007/010601.
Search Report and Written Opinion dated May 28, 2008 from International Application No. PCT/US2007/019862.
Examination Report dated Sep. 18, 2013 from European Patent Application No. 04810467.3.
Examination Report dated Sep. 28, 2015 from European Patent Application No. 04709031.1.
Examination Report dated May 31, 2013 from European Patent Application No. 04709031.1.
Search Report dated Jul. 6, 2011 from European Patent Application No. 04709031.1.
Search Report dated Jan. 22, 2010 from European Patent Application No. 04812909.2.
Search Report dated Jan. 27, 2011 from European Patent Application No. 04810467.3.
Notice of Allowance dated Nov. 8, 2011 from Japanese Patent Application No. 2006-528525.
Office Action dated Oct. 26, 2010 from Japanese Patent Application No. 2006-538525.
Office Action dated May 31, 2011 from Japanese Patent Application No. 2006-538525.

ENSURING AUTHENTICITY IN A CLOSED CONTENT DISTRIBUTION SYSTEM

CROSS-REFERENCE TO RELATED APPLICATIONS

This application is a continuation application of U.S. patent application Ser. No. 15/131,883, filed on Apr. 18, 2016, which is a continuation of U.S. patent application Ser. No. 12/507,050, filed on Jul. 21, 2009, which is a continuation-in-part application of U.S. patent application Ser. No. 10/463,224, filed on Jun. 16, 2003, which is a continuation-in-part application of U.S. patent application Ser. No. 10/360,827, filed on Feb. 7, 2003, now U.S. Pat. No. 7,322,042, issued Jan. 22, 2008, all of which are incorporated by reference herein and may be referred to herein as the "incorporated disclosure."

BACKGROUND

Closed content distribution systems include end-to-end systems, including publishing servers, content distribution servers and playback devices, where the content that is playable on playback devices can be completely controlled through appropriate security techniques, and those security techniques make it relatively difficult for any unauthorized third party to distribute content that would be playable on the playback devices.

In known computing systems, content can be delivered in an encrypted form, so that unauthorized recipients are unable to use that content without obtaining a decryption key. In its encrypted form, the content can be delivered either directly from a content server, or more indirectly using one or more intermediate servers such as caching devices. The key can be delivered separately from a key server to authorized recipients only. The key is in general is much smaller than the content, with the effect that the key can be encrypted separately for each authorized recipient without involving significant amounts of communication or computation resources. One effect of delivering the key to only authorized recipients is that only those authorized recipients are able to use the content. In addition to a key, a secure hash or other confirming signature can be delivered separately from the content, such as from the key server, again only to authorized recipients, with the effect that those authorized recipients can verify the authenticity of the content they receive and decrypt.

A first problem in the known art is that if the original content encryption key is compromised (either by being broken computationally or by being disclosed in an unauthorized manner), it becomes possible for a third party to use that encryption key to distribute unauthorized content to playback devices, such as by encrypting the unauthorized content using the compromised encryption key. This is sometimes called "content spoofing." This problem can be ameliorated by including a secure hash along with the encryption key. In such cases the playback device's security software would load and authenticate the entire content before playback, so that unauthorized content encrypted with the compromised key would be detected and the playback device's security software would refuse to play that unauthorized content.

A second problem in the known art occurs if the content is sufficiently large that it must be stored on an insecure storage device (such as for example an external mass storage device) and re-read from that insecure storage device dynamically during playback. In this case, even authenticating the entire content before playback will only provide relatively limited protection against content spoofing, since a sophisticated attacker would be able to replace the content seen by the playback device after its authentication step was completed.

A first possible solution to this problem is to assign separate signatures to each small chunk of content that is loaded from the insecure storage device. While this possible solution achieves the general goal of preventing content spoofing for each chunk individually, it has the initial drawback that in practical systems this technique might require significant computational and communication resources if the loading occurs in large numbers of pieces.

A second possible solution to this problem is for the content server to individually encrypt each copy of the content for the specific authorized recipient of that copy, with the effect that an unauthorized distributor who wishes to serve content to the population of players would have to obtain the specific key for each player to be distributed to. While this possible solution achieves the general goal of preventing content spoofing individual authorized recipients, it is has the initial drawbacks that (1) encrypting each copy of the content for each specific authorized recipient involves significant computation resources at the content server, and (2) the individually encrypted copies of the content for each specific authorized recipient cannot readily be cached by intermediate servers, thus involving significantly greater amounts of communication resources when distributing the content to authorized recipients.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for ensuring authenticity in a closed content distribution system includes generating a decryption key at a secure processor and re-encrypting content at the secure processor using the decryption key. A first example of a method according to the technique can include receiving encrypted content at a secure processor, said secure processor having at least some secure individualized information maintained therein, said secure processor being capable of interpreting said content for presentation. The method can include receiving a license for the content at said secure processor, said license including a first decryption key for said encrypted content and information sufficient to verify that the content is authentic at said secure processor. The method can include verifying at said secure processor authenticity of the content, using the information sufficient to verify that the content is authentic. The method can include generating a second decryption key at said secure processor, in response to verifying authenticity of the content, said second decryption key being independent of said first decryption key, wherein the second decryption key is stored in secure memory and is secure against discovery outside said secure processor. The method can include re-encrypting the content at said secure processor using said second decryption key.

The first example of a method may or may not further include receiving the encrypted content in portions, where a signature is associated with each portion; delivering physical media having information readable therefrom; enforcing re-encrypting the content with security software before using said secure processor to interpret the content; verifying that said content is authentic occurs before using said secure processor to interpret said content; maintaining at least a portion of a result of said re-encrypting said content secure against discovery outside said secure processor; decrypting said encrypted content using the first decryption key; decrypting the re-encrypted content using the second decryption key and consuming the content; storing the re-encrypted content and maintaining an association between the re-encrypted content and the second decryption key outside of the secure memory; retrieving the re-encrypted content from external storage, retrieving an association between the re-encrypted content and the second decryption key, and decrypting the re-encrypted content with the second decryption key; storing the re-encrypted content without generating a third decryption key and without re-encrypting the content again and maintaining, outside of the secure memory, an association between the second decryption key and the re-encrypted content; disposing of content that is not determined to be authentic.

A second example of a method according to the technique can include receiving content that has been encrypted; receiving a license for the content, said license including a first key that can be used to decrypt the encrypted content and a signature that can be used to verify the content is authentic; generating a second key; decrypting the encrypted content using the first key; re-encrypting the content, using the second key; checking authenticity of the content, using the signature in the license; if the content is authenticated: storing the second key in secure memory for future decryption of the content, decrypting the content using the second key, presenting the content; wherein the second key is not stored if the content is not authenticated.

A third example of a method according to the technique can include receiving content that has been encrypted; receiving a license for the content, said license including a first key that can be used to decrypt the encrypted content and a signature that can be used to verify the content is authentic; decrypting the encrypted content using the first key; verifying authenticity of the content, using the signature; if authenticity is verified: generating a second key at a secure processor, re-encrypting the content using the second key at the secure processor, maintaining the second key at the secure processor, wherein the second key is never stored in the clear, and wherein never storing a key in the clear includes storing the key only in secure memory, decrypting the content using the second key at the secure processor, and presenting the content.

These and other advantages will become apparent to those skilled in the relevant art upon a reading of the following descriptions and a study of the several examples of the drawings.

DETAILED DESCRIPTION

Figure 1:
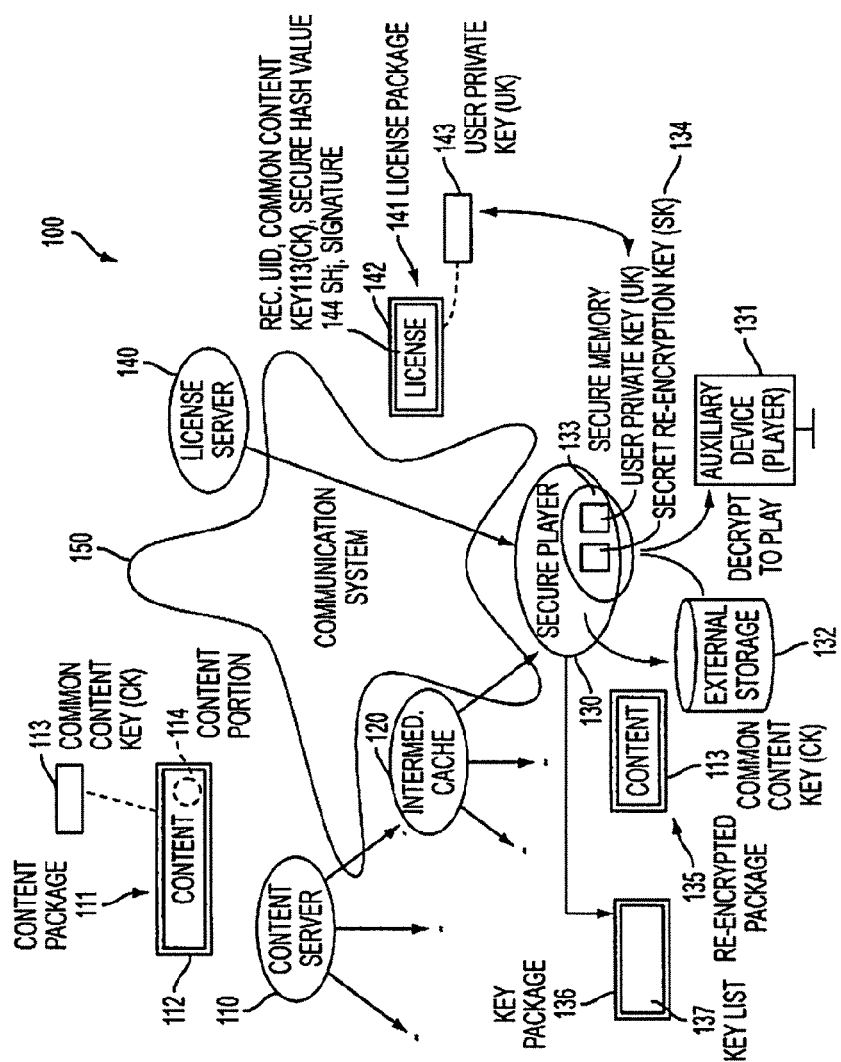
FIG. 1 shows a block diagram of an example of a system including a distribution network for content and licenses to a secure processor.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Techniques described herein may provide a system or method in which the authenticity of content executed by devices in a closed distribution system is ensured, and in which the content might be stored using an insecure device (such as for example an external mass storage device) and loaded into a secure device for use, such as execution or presentation. The methods and systems include (1) run time cryptographic-strength verification of the content, and (2) a technique by which unauthorized distribution of untrusted content is made ineffective, even when complete authentication during execution is relatively infeasible.

Secure content is encrypted for delivery to a secure playback device, the secure playback device including at least some individualized and secure information, in a system in which the content is re-encrypted for the secure playback device, with the effect that the secure playback device is able to maintain an individualized secure copy of the content. In an embodiment, the individualization includes a secret transformation of the content data (such as for example encryption using a symmetric secret re-encryption key) such that it is practically impossible to attempt to create that trans-formed data without knowledge of the secret re-encryption key. Security software in the device ensures that the individualization step is mandatory and only individualized content can be played or executed. This has the effects that unauthorized users cannot readily use individualized secure copies, and that unauthorized distributors cannot exploit a compromised encryption key to distribute unauthorized content to a large population of playback devices.

Among other cases, the invention is applicable in the context of a rights managed content distribution system, where a content server delivers the content to the secure processor, encrypted with a content key CK, a license server delivers a license to the secure processor, encrypted with an individualized user private key UK, and the secure processor re-encrypts the content with a unique secret re-encryption key SK, which it generates and maintains. In one embodiment, encryption and key management involve a public-key crypto system, in which each key involves a paired public key K and private counterpart key K*, with the effect that the secure processor can verify the authenticity of the content (signed by the content server), and of the license (signed by the license server, if needed). This has the effect that the content is encrypted in transit between the server and the device, and there exists a secure mechanism by which to communicate, from the server, the secure content hash and the encryption key, to the device.

In a first aspect of the invention, a plurality of signatures is included in the license information, which can be validated during run time as the secure player consumes each chunk of the content. The list of signatures itself would be validated before the execution begins.

In a second aspect of the invention, the secure player authenticates and securely obtains a secret re-encryption key and uses a new secret re-encryption key for re-encrypting the content. The content might be divided into a plurality of chunks, each of which can be separately verified for authenticity. Each such chunk might be assigned a separate content key $CK_i$ and signature, so that each such chunk could be authenticated by the secure player upon receipt of the license. In one embodiment, the secure processor re-encrypts each chunk of the content with a separate secret re-encryption key $SK_i$, although it is possible for the entire content to be re-encrypted with the same secret re-encryption key SK. Because each such chunk is re-encrypted with the secret re-encryption key SK or with its own secret re-encryption key $SK_i$, unauthorized distributors cannot readily distribute even a separate chunk of unauthorized content to a large population of playback devices. The use of significant computational and communication resources, even if the loading occurs in large numbers of pieces, is avoided because decryption might be conducted using the secret re-encryption key SK without having to compute and re-verify each chunk separately.

In a third aspect of the invention, the content might be individually encrypted for the authorized recipient at one or more of a plurality of locations, including the content server, an intermediate server, and the secure processor for the authorized recipient. For example, not intended to be limiting in any way, an intermediate secure device or server associated with a specific set of authorized recipients might be configured to individually re-encrypt the content after receipt from the content server, with the effect that the specific set of authorized recipients need not re-encrypt that content themselves. In one embodiment, this allows intermediate secure devices or servers to cache encrypted copies of the content for delivery to multiple recipients, without losing either the advantage of such caching or compromising the ability of those recipients to verify the content they receive.

Lexicography

The following terms relate or refer to aspects of the invention or its embodiments. The general meaning of each of these terms is intended to be illustrative and in no way limiting.

The term "content" describes application software, multimedia content, reason-able combinations or generations thereof, and the like. Application software includes any set of instructions or parameters capable of being executed or interpreted by a processor. The concept of application software is broad, and is intended to include at least the following: software or firmware program instructions, software or firmware program parameter values, source code capable of being compiled by a programming language compiler or interpreted by a programming language interpreter, macro definitions for a compiled or interpreted programming language, commands or requests to be received and acted upon by an application program, any reasonable generalization thereof, and the like (computer program used in an arcade game, or if the content is a set of movie snippets (or other audiovisual elements) to be used in an arcade game). Multimedia content includes any set of information or parameters capable of being presented to a user. The concept of multimedia content is broad, and is intended to include at least the following: animation, audiovisual movies, still pictures, or sound, whether embedded in data for interpretation and presentation by software or firmware program instructions; embedded in software or firmware program instructions for producing such data themselves; embedded in a markup language for multimedia content, such as DHTML, SGML, VRML, Macromedia Flash, and the like; commands or requests to be received and acted upon by an application program; any reasonable generalization thereof; and the like.

The phrases "secure playback device", "secure player" and "secure processor" describe any device on which the content is interpreted, such as for example being executed, if application software, or presented, if multimedia content. The concept of a secure processor is broad, and includes any general purpose or special purpose computing device for which there is at least some secure memory, secured against inspection or intrusion from outside the secure processor, and for which there is at least some executive control capable of preventing application software from disclosing the contents of that secure memory. In one embodiment, the secure player includes a built-in UID (unique identifier), its own private/public key pair in a public-key cryptosystem, and is capable of secure communication with other devices thereby. Preferably, the secure processor has built in security software that cannot readily be circumvented, or other techniques to securely bootstrap the loading of such security software from insecure devices, such as for example external mass storage.

The phrases "content server" or "content distribution server" describe any device that is capable of delivering content (either directly or indirectly), as described above, to a secure player or secure processor, using any form of transport technique, as described herein. The concept of a content server is broad, and includes not only a server having content stored thereon, but also devices by which content might be dynamically created, such as a television camera, video camera, webcam, any reasonable generalization thereof, and the like. The content server may include a secure device capable of generating a secure hash and securely signing any information distributed from the server.

The phrase "intermediate server" describes any device that is capable of forwarding content from the content server to the secure processor, using any transport method (as described below). In one embodiment, the intermediate server might include a caching device capable of maintaining in memory, for at least a time, at least a portion of the content, as that content is sent from the content server to the secure processor. In one embodiment, intermediate servers might be distributed geographically or topologically, with the effect that an intermediate server relatively local to the secure processor might service requests to the content server.

The phrase "transport method" describes any method used to send information, such as for example content, portions of content, licenses, or other information, from a first device to a second device, such as for example from the content server to the secure processor. The concept of a transport method is broad, and includes electronic forms of transport, such as computer communication net-works and private or public switching networks, as well as physical transport of media from which the information can be sensed. There is no requirement that a transport method be homogeneous; for example, a transport method might employ both electronic communication and physical transport at different times or for different portions of the information, or otherwise in combination or conjunction.

The phrases "license" or "license information" describe information sufficient for the secure player to verify the authenticity of the content and to use the content. In one embodiment, the license information includes at least a decryption key for the content and information sufficient to verify that the content is authentic (such as for example, either a secure hash or a secure signature). In one embodiment, licenses are individually tailored to each authorized recipient or user, although in the context of the invention there is no such particular requirement.

The phrase "license server" describes any device that is capable of delivering (either directly or indirectly) license information In one embodiment the license server includes an online transaction server capable of requesting an identity of the device requesting the license and capable of creating, in response, a crypto-graphically signed data structure containing information specifying a device identity, a content identity and a set of content decryption keys.

The scope and spirit of the invention is not limited to any of these definitions, or to specific examples mentioned therein, but is intended to include the most general concepts embodied by these and other terms.

System Elements

FIG. 1 shows a block diagram of a system including a distribution net-work for content and licenses to a secure processor.

A system 100 includes a content server 110, one or more optional intermediate servers 120, a secure player 130, a license server 140, and a communication system 150.

The content server 110 includes any device or system capable of delivering a content package 111 including content 112 to the secure player 130, directly or indirectly. In one embodiment, the content server 110 might include a server device capable of receiving requests for content 112 from the secure player 130, and responding to those requests by sending content 112 packaged in the content package 111 using the communication system 150. However, in the context of the invention, there is no particular requirement that the content server 110 receives explicit requests for content 112 from the secure player 130. For example, not intended to be limiting in any way, the content server 110 might deliver the content package 111 including content 112 to the secure player 130, in accordance with a request for a subscription to that content 112, a request from a device other than the secure player 130, an original request from the secure player 130 or another device for the content 112 and any updates thereto, reasonable generalizations thereof, and the like.

The license server 140 includes any device or system capable of delivering a license package 141 including a license 142 to the secure player 130, directly or indirectly. In one embodiment, the license server 140 might include a device similar to the content server 110. However, in the context of the invention, there is no particular requirement that content server 110 and the license server 140 operate in the same or a similar manner. For example, not intended to be limiting in any way, the content server 110 might deliver the content package 111 in a first manner, while the license server 140 delivers the license package 141 in a second manner.

Those skilled in the art will recognize, after perusal of this application, that in the context of the invention, there is no particular requirement that the content package 111, the content 112, the license package 141, or the license 142, be embodied in any particular format. For a first example, not intended to be limiting in any way, any one of these elements might be represented by one or more messages in an underlying communication transport protocol. For a second example, not intended to be limiting in any way, any one of these elements might be represented by inclusion or incorporation into a set of messages for collectively transporting multiple such elements. Thus, for example, not intended to be limiting in any way, it might occur that the content 112 is distributed over several separate messages in a transport protocol such as FTP or HTTP, or it might occur that more than one license 142 is packaged into a single license package 141, or that more than one license package 141 is included in a single message in a transport protocol such as FTP or HTTP. Those skilled in the art would recognize, after perusal of this application, that in the context of the invention, there is no particular requirement that the transport protocol need be either of these specific protocols, but might include other and further protocols, combinations of transport techniques, or significant variants thereof.

The intermediate servers 120 include any device or system capable of delivering the content package 111 including the content 112 to the secure player 130, directly, or indirectly using one or more additional intermediate servers 120. The intermediate servers 120 might include caching devices or other store-and-forward devices, such as for example internet routers, capable of maintaining copies (or portions of copies) of the content package 111, received from one or more content servers 110 and deliverable to one or more secure players 130. The intermediate servers 120 might also include caching devices or other store-and-forward devices capable of maintaining copies of the license package 141, received from one or more license servers 140 and deliverable to one or more secure players 130. In the context of the invention, there is no particular requirement of any specific path between the content server 110 and the secure player 130, or of any specific path between the license server 140 and the secure player 130.

The communication system 150 includes any device or system, or technique, capable of delivering information (such as for example the content package 111) among the elements of the system 100. In one embodiment, the communication system 150 includes a communication network, such as for example an Internet, intranet, extranet, VPN, LAN, WAN, enterprise network, private or public switched network, or broadcasting system, capable of electronic communication of the content package 111 including the content 112. However, in the context of the invention, there is no particular requirement that the communication system 150 operates electronically, either in whole or in part. For example, not intended to be limiting in any way, the communication system 150 might include (at least in part) transport of physical media on which the content package 111 including the content 112 is encoded, such as for example a CD-ROM, rewritable CD, DVD, floppy disk, detachable hard disk drive, magnetic tape, paper tape, bar-coded package, or any other media capable of being sensed and interpreted by the secure player 130.

The secure player 130 includes a computing device capable of performing the tasks described herein, including receiving the content package 111 including the content 112 directly or indirectly from the content server 110, and receiving the license package 141 including the license 142 directly or indirectly from the license server 140. In one embodiment, the secure player 130 includes a secure processor as described in the incorporated disclosure, optionally augmented using at least one auxiliary device 131 and external storage 132. In one embodiment, the external storage 132 might include RAM (random access memory), mass storage devices (such as for example magnetic or optical disk drives), or some combination thereof.

Those skilled in the art will recognize, after perusal of this application, that in the context of the invention, there is no particular requirement that the content server 110, the intermediate servers 120, and the license server 140, actually be separate devices. For one example, not intended to be limiting in any way, the content server 110 and the license server 140 might be co-hosted at the same device, which device would serve both the function of the content server 110 and the function of the license server 140. Those skilled in the art will recognize, after perusal of this application, that other and further variants of these ideas are within the scope and spirit of the invention, and would be workable without undue experimentation or further invention.

Encryption and Re-Encryption

The content package 111 maintained at the content server 110 includes content 112, and possibly other data regarding the content (sometimes referred to herein as "content metadata"), encrypted using a content key 113 CK, common to all content packages 111 including that content 112. This has the effect that for common content 112, each content package 111 is substantially identical, and may be maintained at the one or more intermediate caches 120 for relatively local delivery to secure players 130, even when those secure players 130 are relatively widely distributed. The content package 111 maintained at the one or more intermediate caches 120 thus includes the same content 112, and the same content metadata, encrypted using the same content key 113 CK.

As described above, the content package 111 might be transported either electronically or using physical media, with the effect that the content package 111 might be encoded in one or more files, messages, tracks, or other separable divisions of information to be sent or stored in the context of computer devices or systems. Portions of the content package 111, or of the content 112, are herein sometimes referred to as "chunks" of the content package 111, or of the content 112.

Those skilled in the art will recognize, after perusal of this application, that in the context of the invention, there is no particular requirement for division of the content package 111, or of the content 112, into any particular type of chunks, if such division is to be performed at all. Such chunks might or might not correspond to the portions 114 of the content 112 verifiable using the one or more secure hash values 144 $SH_i$ (as described below). For example, not intended be limiting in any way, the content package 111, or the content 112, might be divided into chunks in response to a maximum packet size or other communication feature of the communication system 150. Those skilled in the art will recognize, after perusal of this application, that other and further variants of these ideas are within the scope and spirit of the invention, and would be workable without undue experimentation or further invention.

The license package 141 maintained at the license server 140 includes one or more licenses 142, each license 142 being specific to an individual set of content 112 and an individual secure player 130, encrypted using a user private key 143 UK. In alternative embodiments, each license 142 might be specific to a designated set of secure players 130, such as for example a set of secure players 130 belonging to a common owner, located at a common place, or having a common configuration type. Each license 142 includes information sufficient to decrypt the content 112 and verify that that content 112 is authentic, and possibly other data regarding how the content is protected or how the secure player is allowed to use the content 112. In one embodiment, each license 142 includes a recipient UID (unique identifier) for the secure player 130 to which it is directed, the content key 113 CK, one or more secure hash values 144 SH (sometimes referred to collectively herein as "the" secure hash value 144 SH) using which the secure player 130 can verify the authenticity of (at least an $i^{th}$ portion of) the content 112, and a cryptographically-secure signature identifying the source of the license package 141 and of the license 142. For example, not intended to be limiting in any way, the cryptographically-secure signature might include causing the license package 141 to be decrypted using a private license-server key LK* corresponding to a public license-server key LK, the latter being known to the secure player 130.

Those skilled in the art will recognize, after perusal of this application, that in the context of the invention, it would also be possible for the license package 141, or the licenses 142, to be divided into chunks for sending within the communication system 150. In one embodiment, it is envisioned that the license package 141 would be relatively small, and thus would not be divided into chunks for sending within the commutation system 150. However, those skilled in the art will recognize, after perusal of this application, that division of the license package 141, or the licenses 142, into chunks is within the scope and spirit of the invention, and would be workable without undue experimentation or further invention.

The secure player 130 includes at least some secure memory 133, for which the secure player 130 is capable of assuring that information maintained in the secure memory 133 cannot be readily obtained from outside the secure player 130 or without the permission of the secure player 130. In the secure memory 133, the secure player 130 includes at least its own individual user private key 143 UK. In response to the license package 141, the secure player 130 generates a secret re-encryption key 134 SK, preferably unique to the individual combination of the content package 111 and the license package 141, and preferably generated using a pseudorandom or random technique within the secure processor. In order to launch the execution of (or otherwise use) the content package 111 for the first time, the secure player 130 verifies the license 142 and extracts its contents using the individual user private key 143 UK. The secure player 130 uses the embedded content key 113 CK to decrypt the content 112 and to compute the hash of the content, and to verify the hash of the content against a hash maintained in the license 142, if present. The secure player 130 re-encrypts the content 112 using the newly-generated secret re-encryption key 134 SK. This has the effect of producing a re-encrypted package 135, including the content 112 and any content metadata, encrypted using the secret re-encryption key 134 SK, and verifiable using the secure hash value 144 SH for subsequent launches (or other types of uses).

In one embodiment, the secure player 130 maintains the secret re-encryption key 134 SK in its secure memory 133, with the effect that only the specific secure player 130 that computed the newly-generated secret re-encryption key 134 SK (after having authenticating the content 112) can decrypt the content 112 correctly. As used in this paper, "stored in the clear" is intended to mean "stored in a memory other than secure memory." Since it is possible, using techniques described in this paper, to store the newly-generated secret re-encryption key 134 SK at all times in the secure memory, there is no need to allow the encryption key 134 SK to be stored in the clear. Accordingly, in an embodiment, the newly-generated secret re-encryption key 134 SK is never stored in the clear.

In a second embodiment, the secure player 130 maintains an internal secret re-encryption key, which is used to encrypt a list of content re-encryption keys. This list of content re-encryption keys is signed and encrypted and stored on external mass storage 132. The external mass storage 132 might fail to be secure against copying, intrusion, or tampering, without compromising the security of the closed system, or degrading the ability of the secure player 130 to verify content 112 as authentic.

Those skilled in the art will recognize, after perusal of this application, that in the context of the invention, it would also be possible for the content 112 to be delivered to the secure player 130 in its individual portions 114, each encrypted using the content key 113 CK, and each re-encrypted by the secure player 130, either using a single secret re-encryption key 134 SK or a plurality of such secret re-encryption keys 134 $SK_j$ (in the latter case, one such secret re-encryption key 134 $SK_j$ for the $j^{th}$ such individual portion 114). For example, not intended to be limiting in any way, the content 112 might include streaming media, such as an audiovisual movie to be displayed using the one or more auxiliary devices 131, and delivered to the secure player 130 as a streaming sequence of portions 114 of that streaming media. In such cases, although the secure player 130 might not have the entire content 112 available in one piece, those skilled in the art would recognize, after perusal of this application, that such cases are still within the scope and spirit of the invention, and the concepts of the invention would still be workable without undue experimentation or further invention.

In a second embodiment, the content 112 might be separately and distinctly encrypted at one or more of a plurality of locations, including for example the content server 110, one or more intermediate servers 120, or the secure player 130 itself. For example, not intended to be limiting in any way, an intermediate secure server 120 associated with a specific set of authorized users might be configured to individually re-encrypt the content 112 after receipt from the content server 110 the equivalent of a license to re-encrypt (containing content key encrypted for the intermediate device), with the effect that the specific set of authorized users need not re-encrypt that content 112 themselves. This method of using a secure intermediary might be useful in the context where the player device does not contain a re-writeable mass storage medium or where re-writing is cumbersome.

Re-Encryption Key Management

The secure player 130 maintains, for each set of content 112, a separate secret re-encryption key 134 SK associated with that content 112, in its secure non-volatile memory 133. In the event that the secure memory 133 is not large enough to maintain all such separate secret re-encryption keys 134 SK, the secure player 130 constructs a re-encryption key package 136 KP including a re-encryption key list 137 of such separate secret re-encryption keys 134 SK, encrypted with a new secret re-encryption key 134 $SK_p$ for the re-encryption key package 136 KP itself. Since the re-encryption key package 136 KP is encrypted using the new secret re-encryption key 134 $SK_p$, the secure player 130 can maintain the encrypted re-encryption key list 137 in the re-encryption key package 136 KP on the external storage devices 132, while keeping the new secret re-encryption key 134 $SK_p$ in its secure memory 133, without fear that that any person (including the user) can obtain any of the separate secret re-encryption keys 134 SK in the re-encryption key list 137.

In the event that the secure memory 133 is not large enough to maintain both the new secret re-encryption key 134 $SK_p$ and further separate secret re-encryption keys 134 SK associated with further content 112, in its secure memory 133, the secure player 130 constructs a second re-encryption key package 136 KP; including a second re-encryption key list 137 of such separate secret re-encryption keys 134 SK, encrypted with a another new secret re-encryption key 134 $SK_p$ for the second re-encryption key package 136 KP itself.

Those skilled in the art will recognize, after perusal of this application, that it would be possible to maintain an arbitrarily large number of such separate secret re-encryption keys 134 SK by hierarchical or linear repetition of this technique.

Method of Operation

FIG. 2 depicts a flowchart of an example of a method of operating the distribution network for content and licenses to a secure processor.

A method 200 is performed by the system 100. The method is organized as a sequence of modules in the flowchart 200. However, it should be understood that these modules may be reordered for parallel execution or into different sequences of modules. There is no particular requirement that the method 200 must be performed in the same order in which this description lists modules, except where explicitly so indicated.

Content Delivery

Figure 2A:
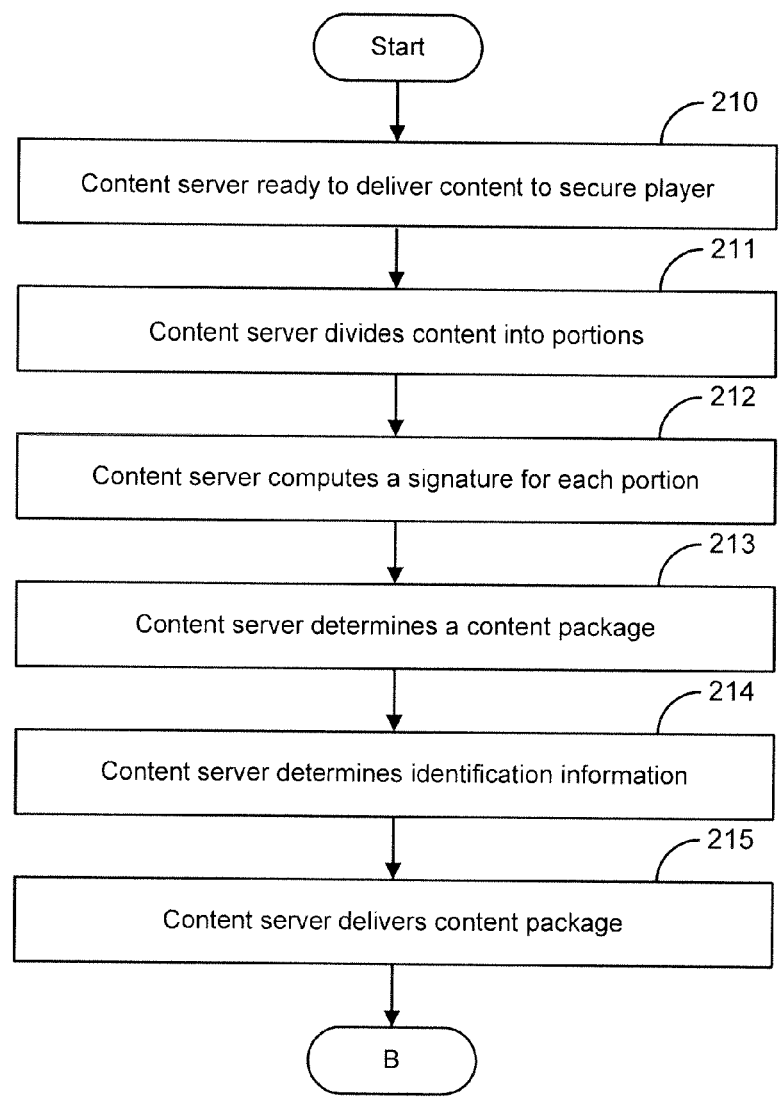
FIGS. 2A to 2D show a process flow diagram of an example of a method of operating the distribution network for content and licenses to a secure processor.

In the example of FIG. 2A the flowchart starts at module 210, the content server 110 is ready to deliver content 112 to one or more secure players 130.

In the example of FIG. 2A the flowchart continues to optional module 211, the content server 110 divides the content 112 into one or more portions thereof (not shown). In embodiments where this step is omitted, the content 112 is considered divided into only a single such portion.

In the example of FIG. 2A the flowchart continues to module 212, the content server 110 computes a signature (such as for example a secure hash value $SH_i$, such as for example as generated by the SHA-1 function) for each said portion of the content 112. As an optional part of this step, the content server 110 might computes a signature (such as for example a secure hash value) for the set of secure hash values $SH_i$, the collective such signature being included with the set of secure hash values $SH_i$ as part of a collective secure hash value SH.

In the example of FIG. 2A the flowchart continues to module 213, the content server 110 determines a content package 111, including all portions of the content 112, plus any information needed to verify those portions of the content 112 (such as for example the secure hash values $SH_i$ computed for each such portion of the content 112), encrypted using the content key 113 CK.

In the example of FIG. 2A the flowchart continues to module 214, the content server 110 delivers with the content key 113 CK, any information needed to identify the portions of the content 112 (such as for example their offsets and lengths), and the information needed to verify those portions of the content 112 (such as for example the secure hash values $SH_i$ computed for each such portion of the content 112), to the license server 140. As part of this step, in one embodiment, the content server 110 delivers this information to the license server 140 using a secure infrastructure overlaid on the communication system 150.

For a first non-limiting example the content server 110 delivers this information to the license server 140 using a public key cryptosystem, in which the information to be delivered is digitally signed using a private key for the content server 110 and encrypted using a public key for the license server 140. In one embodiment, the license package itself is secured (encrypted and signed), so that there is no need for a secure infrastructure for the delivery channel.

For a second non-limiting example the content server 110 delivers this information to the license server 140 using a secure courier, the secure courier carrying media from which the license server 140 can read the in-formation.

In the example of FIG. 2A the flowchart continues to module 215, the content server 110 delivers the content package 111, using the communication system 150 and optionally using the intermediate servers 120, to the secure player 130.

License Delivery

Figure 2B:
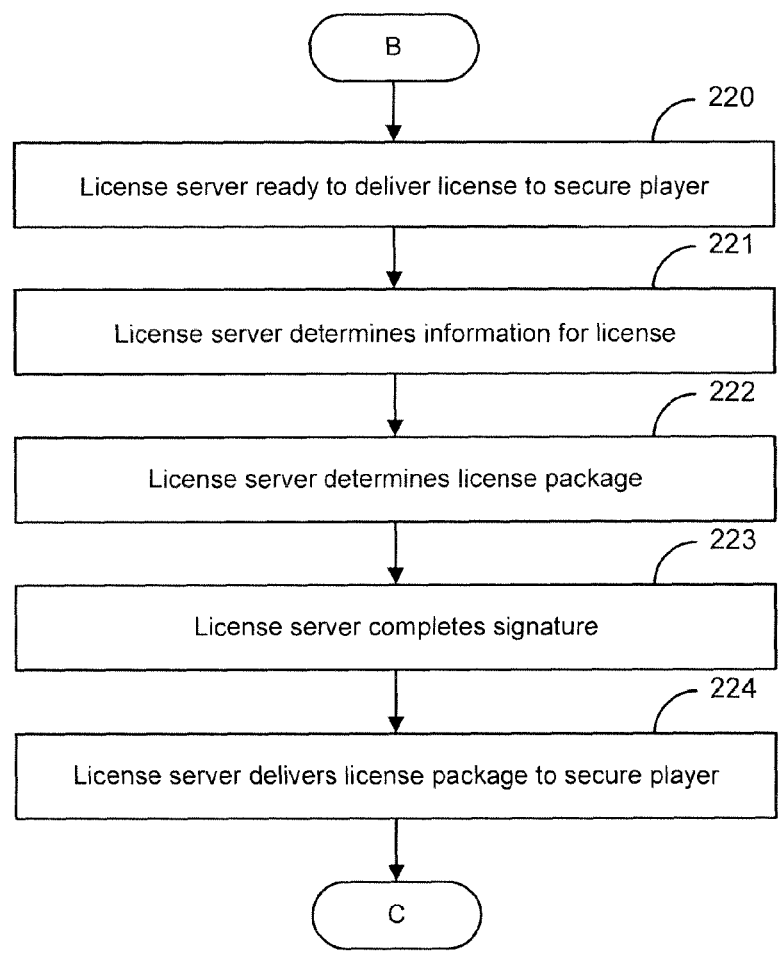

In the example of FIG. 2B the flowchart starts at module 220, the license server 140 is ready to deliver licenses 142 to one or more secure players 130.

In the example of FIG. 2B the flowchart continues to module 221, the license server 140 determines information for an individual license 142 for a selected secure player 130.

In the example of FIG. 2B the flowchart continues to module 222, the license server 140 determines a license package 141, including the license 142, plus any information needed to verify the license 142 (such as for example the secure hash value), encrypted using the recipient public key in a public-key cryptosystem. In alternative embodiments, similar methods using shared key computation may be used.

In the example of FIG. 2B the flowchart continues to module 223, the license server 140 computes a signature (such as for example a secure hash value, such as for example as generated by the SHA-1 function) for the license 142.

In the example of FIG. 2B the flowchart continues to module 224, the license server 140 delivers the license package 142 to the secure player 130. As part of this step, in one embodiment, the license server 110 delivers this information to the secure player 130 using a secure infrastructure overlaid on the communication system 150.

For a first non-limiting example, the license server 140 delivers this information to the secure player 130 using a public key cryptosystem, in which the information to be delivered is digitally signed using a private key for the license server 140 and encrypted using a public key for the secure player 130.

For a second non-limiting example, the license server 140 delivers this information to the secure player 130 using a courier, the courier carrying media from which the secure player 130 can read the information. Those skilled in the art will recognize, after perusal of this application, that the courier need not be secure.

Re-Encryption

Figure 2C:
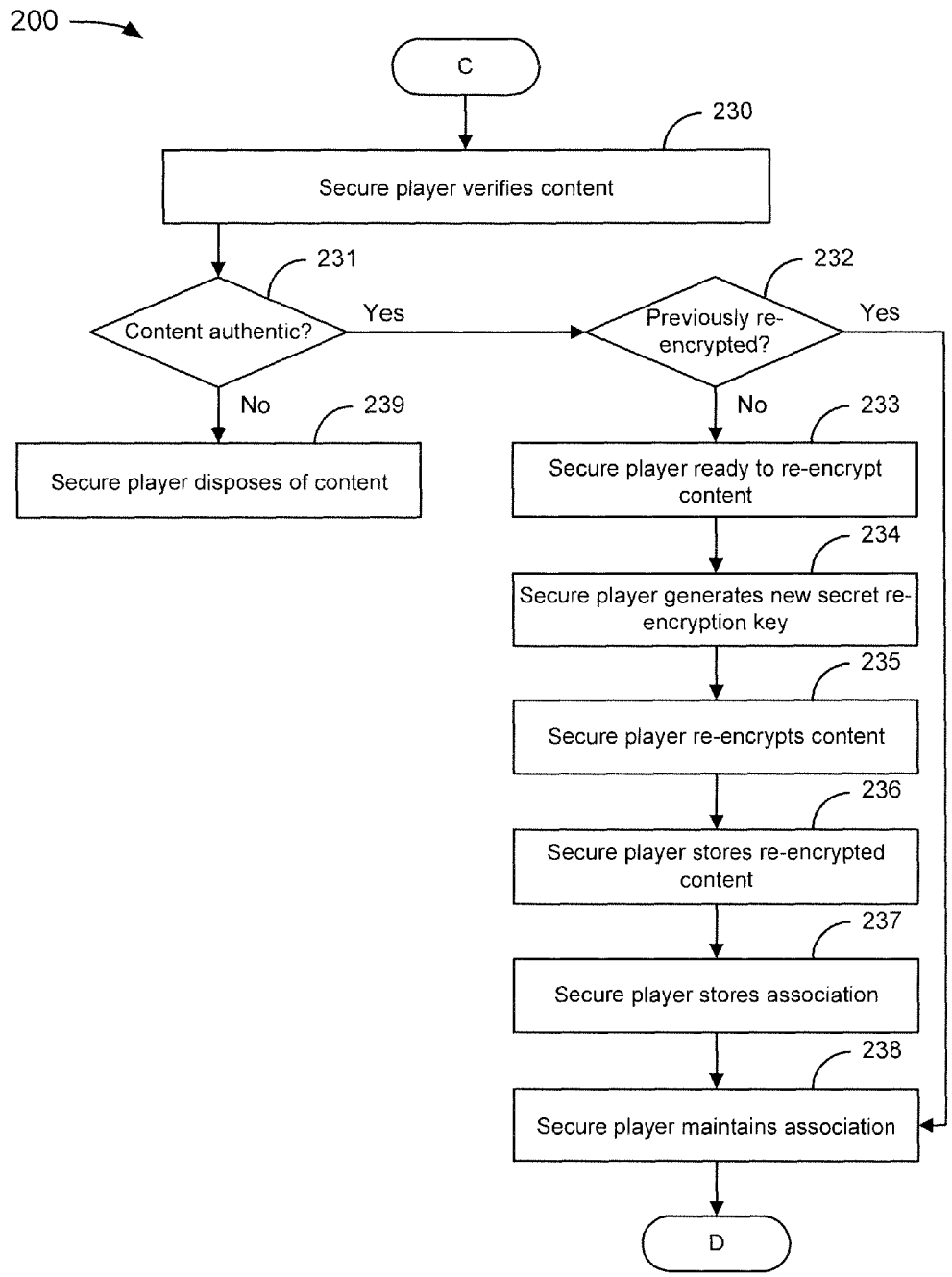

In the example of FIG. 2C the flowchart starts at module 230, the player first verifies signatures on the license package up to a trusted root and extracts a content key from the license package.

The flowchart continues to decision point 231 where it is determined whether content is authentic. If it is determined that the content is not authentic (231—No), then the flowchart continues to module 239 where the secure player deletes the unverified content and any previously generated re-encryption key and the process ends. However, if it is determined that the content is authentic (231—Yes), then the flowchart continues to decision point 232, where it is determined whether the content has been previously re-encrypted. If the content has previously been re-encrypted (232—Yes) the flowchart continues to module 238, described below. However, if this content has not been re-encrypted before, that is, if it does not have a previously generated secret re-encryption key for this content (232—No), and the content hash or signature matches the one in the license, a decision is made to proceed with re-encryption and the flowchart continues to module 233, where the secure player 130 is ready to re-encrypt the content 112 for maintenance on the one or more external storage devices 132.

In the example of FIG. 2C the flowchart continues to module 234, the secure player 130 generates a (new) secret re-encryption key 134 SK, preferably unique to the specific content 112 to be re-encrypted. In alternative embodiments where the content 112 is divided into chunks, the secure player 130 may generate a separate (new) secret re-encryption key 134 $SK_i$ for each such chunk.

In the example of FIG. 2C the flowchart continues to module 235, the secure player 130 re-encrypts the content 112 using the secret re-encryption key 134 SK. In alternative embodiments where the content 112 is divided into chunks, the secure player 130 may separately re-encrypt the content 112 using the separate secret re-encryption key 134 $SK_i$ for each such chunk.

In the example of FIG. 2C the flowchart continues to module 236, the secure player 130 stores the re-encrypted content 112 (but not its secret re-encryption key 134 SK) on external storage 132, with the effect that the re-encrypted content 112 is possibly subject to copying, intrusion, or tampering, but with the effect that none of such actions can readily obtain the original content 112.

In the example of FIG. 2C the flowchart continues to module 237, the secure player 130 stores an association between the re-encrypted content 112 and its secret re-encryption key 134 SK, within a re-encryption key list 137 in the secure storage 133. Naturally, if the re-encryption key has been previously generated, the secure player may or may not store (again) the previously generated re-encryption key. It follows that, depending upon the embodiment and/or implementation, the secure player can retain the previously generated re-encryption key.

In the example of FIG. 2C the flowchart continues to module 238, in the event that there is insufficient room to maintain all such associations between re-encrypted content 112 and secret re-encryption keys 134 SK in the secure storage 133, the secure player 130 maintains those associations in the external storage 132. To perform this step, the secure player 130 performs the following sub-steps:

The secure player 130 creates a re-encryption key package 136 KP, including or incorporating a re-encryption key list 137.

The secure player 130 generates a (new) secret re-encryption key 134 $SK_p$ for that re-encryption key package 136 KP. In alternative embodiments, that unique secret re-encryption key could be programmed into the chip from a random source (such as for example a true hardware random source) at the time of chip manufacture.

The secure player 130 encrypts that re-encryption key package 136 KP using the (new) secret re-encryption key 134 $SK_p$.

The secure player 130 stores the encrypted re-encryption key package 136 KP in the external storage 132, while maintaining an association between the re-encryption key package 136 KP and its separate secret re-encryption key 134 $SK_p$ in the secure storage 133.

The secure player 130 might repeat this step 238 as many times as needed to maintain all such associations between re-encrypted content 112 and secret re-encryption keys 134 SK securely (that is, with at least one component thereof in the secure storage 133).

Content Use

Figure 2D:
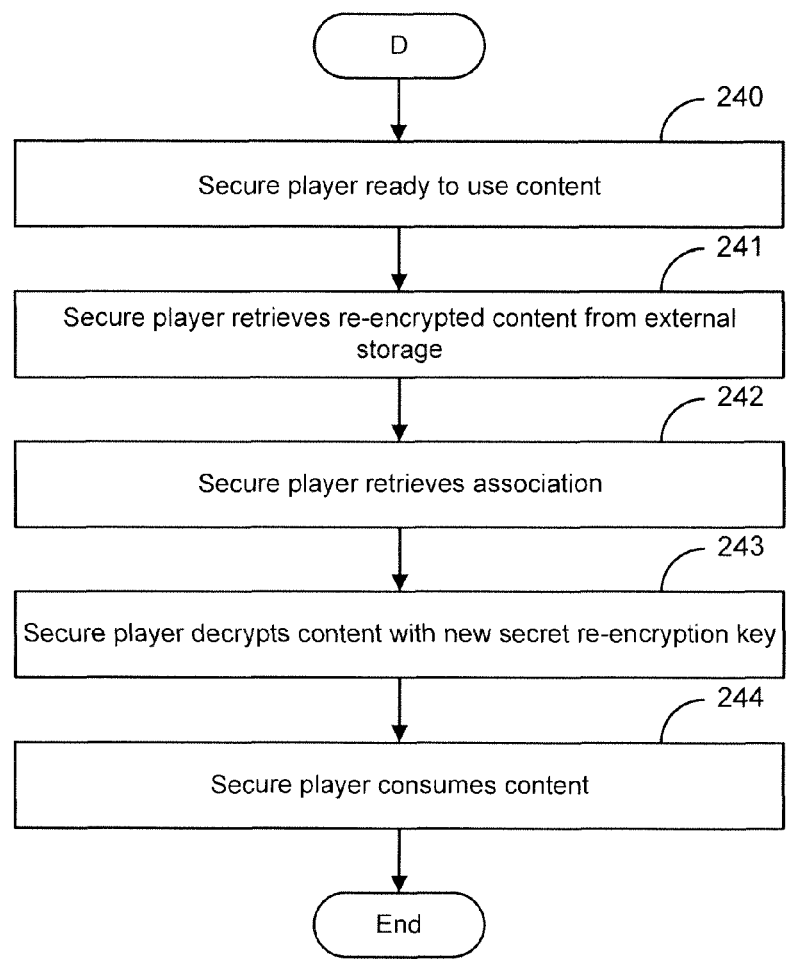

In the example of FIG. 2D the flowchart starts at module 240, the secure player 130 is ready to use the content 112.

In the example of FIG. 2D the flowchart continues to module 241, the secure player 130 retrieves the re-encrypted content 112 from the external storage 132.

In the example of FIG. 2D the flowchart continues to module 242, the secure player 130 retrieves the association between the re-encrypted content 112 and its secret re-encryption key 134 SK, either from the secure storage 133, or if the step 235 was performed more than once, from the external storage 132 in stages.

In the example of FIG. 2D the flowchart continues to module 243, the secure player 130 decrypts the re-encrypted content 112 using its secret re-encryption key 134 SK and executes the content within the secure processor or a secure perimeter associated therewith. For example, not intended to be limiting in any way, the external device (such as for example an execution engine) 131 might include an arcade game device, an audiovisual display device, or other devices.

In the example of FIG. 2D when the flowchart ends 244, the external device 131 has consumed the content 112, and the secure player 130 might mark it consumed, or might record the state of consumption of the content in a signed data structure. This signed data structure might be stored in mass storage and read along with the license, by the secure player, to determine eligibility of use, during content launch. A scheme such as this might be used to implement a limited-play licensing scheme.

Alternative Embodiments

Although embodiments are disclosed herein, many variations are possible which remain within the concept, scope, and spirit of the invention. These variations would become clear to those skilled in the art after perusal of this application.

Those skilled in the art will recognize, after perusal of this application, that these alternative embodiments and variations are illustrative and are intended to be in no way limiting.

What is claimed is:

1. A method executed by a secure processor of a secure player, the secure player comprising secure memory secured against access outside the secure player and insecure memory, the method comprising:
   receiving encrypted content comprising a plurality of data portions in an encrypted format;
   receiving a license having a first cryptographic key and a plurality of signatures, the first cryptographic key configured to facilitate first decryption of the encrypted content, and each of the plurality of signatures configured to verify validity of at least one of the plurality of data portions, the license;
   performing the first decryption of the encrypted content using the first cryptographic key;
   verifying the validity of the plurality of data portions using the plurality of signatures;
   generating, in response to verifying the validity, a second cryptographic key to facilitate re-encryption of the encrypted content, the second cryptographic key being independent of the first decryption key;
   storing the second cryptographic key in the secure memory;
   performing the re-encryption of the encrypted content using the second cryptographic key to obtain re-encrypted content;
   storing the re-encrypted content in the insecure memory.

2. The method of claim 1, wherein the plurality of data portions comprises a plurality of data chunks.

3. The method of claim 1, further comprising:
   determining if verifying the validity of the plurality of data portions fails;
   limiting access to the plurality of data portions if verifying the validity of the plurality of data portions fails.

4. The method of claim 1, wherein verifying the validity of the plurality of data portions comprises performing a run-time verification of the validity of the plurality of data portions.

5. The method of claim 1, further comprising maintaining an association between the second cryptographic key and the re-encrypted content.

6. The method of claim 1, further comprising:
   maintaining association data between the second cryptographic key and the re-encrypted content;
   storing the association data in an external storage external to the secure player.

7. The method of claim 1, wherein one or more of the first cryptographic key and the second cryptographic key is part of a cryptographic key pair used for the secure player.

8. The method of claim 1, wherein the encrypted content comprises multimedia content or game content.

9. The method of claim 1, wherein the encrypted content is received from a dynamic content server configured to dynamically create the encrypted content.

10. The method of claim 1, wherein the content is encrypted at a content server.

11. A secure player comprising:
    secure memory;
    insecure memory;
    a secure processor coupled to the secure memory and the insecure memory, the secure processor configured to execute a computer-implemented method, the computer-implemented method comprising:
      receiving encrypted content comprising a plurality of data portions in an encrypted format;
      receiving a license having a first cryptographic key and a plurality of signatures, the first cryptographic key configured to facilitate first decryption of the encrypted content, and each of the plurality of signatures configured to verify validity of at least one of the plurality of data portions, the license;
      performing the first decryption of the encrypted content using the first cryptographic key;
      verifying the validity of the plurality of data portions using the plurality of signatures;
      generating, in response to verifying the validity, a second cryptographic key to facilitate re-encryption of the encrypted content, the second cryptographic key being independent of the first decryption key;
      storing the second cryptographic key in the secure memory;
      performing the re-encryption of the encrypted content using the second cryptographic key to obtain re-encrypted content;
      storing the re-encrypted content in the insecure memory.

12. The secure player of claim 11, wherein the plurality of data portions comprises a plurality of data chunks.

13. The secure player of claim 11, wherein the computer-implemented method further comprises:
    determining if verifying the validity of the plurality of data portions fails;
    limiting access to the plurality of data portions if verifying the validity of the plurality of data portions fails.

14. The secure player of claim 11, wherein verifying the validity of the plurality of data portions comprises performing a run-time verification of the validity of the plurality of data portions.

15. The secure player of claim 11, further comprising maintaining an association between the second cryptographic key and the re-encrypted content.

16. The secure player of claim 11, wherein the computer-implemented method further comprises:
   maintaining association data between the second cryptographic key and the re-encrypted content;
   storing the association data in an external storage external to the secure player.

17. The secure player of claim 11, wherein one or more of the first cryptographic key and the second cryptographic key is part of a cryptographic key pair used for the secure player.

18. The secure player of claim 11, wherein the encrypted content comprises multimedia content or game content.

19. The secure player of claim 11, wherein the encrypted content is received from a dynamic content server configured to dynamically create the encrypted content.

20. The secure player of claim 11, wherein the content is encrypted at a content server.

\* \* \* \* \*